(No Model.) 2 Sheets—Sheet 1.
G. E. HUGULEY & J. T. CHAMBERS, Jr.
COTTON CHOPPING MACHINE.

No. 411,102. Patented Sept. 17, 1889.

Witnesses
W. P. Keene
F. L. Middleton

Inventors
G. E. Huguley
J. T. Chambers Jr.
By Ellis Spear — Atty.

(No Model.) 2 Sheets—Sheet 2.

G. E. HUGULEY & J. T. CHAMBERS, Jr.
COTTON CHOPPING MACHINE.

No. 411,102. Patented Sept. 17, 1889.

Witnesses
W. P. Keene
Jno. McPhail

Inventors.
G. E. Huguley
John T. Chambers Jr.
by Ellis Spear

UNITED STATES PATENT OFFICE.

GEORGE E. HUGULEY AND JOHN THOMAS CHAMBERS, JR., OF BARNESVILLE, GEORGIA.

COTTON-CHOPPING MACHINE.

SPECIFICATION forming part of Letters Patent No. 411,102, dated September 17, 1889.

Application filed June 27, 1888. Serial No. 278,603. (No model.)

*To all whom it may concern:*

Be it known that we, GEORGE E. HUGULEY and JOHN THOMAS CHAMBERS, Jr., citizens of the United States, residing at Barnesville, in the county of Pike and State of Georgia, have invented a new and useful Cotton-Chopping Machine with Cotton and Corn Planting Attachments, of which the following is a specification.

Our invention is an improved cotton-chopper; and it consists in the details of construction hereinafter fully set forth, by which the device is made very simple and effective in operation.

Figure 1:
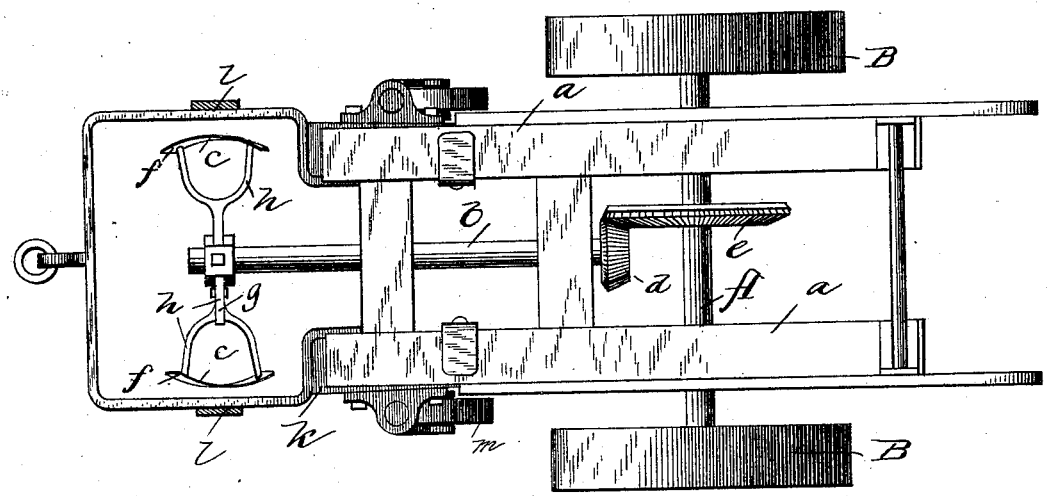
Figure 2:
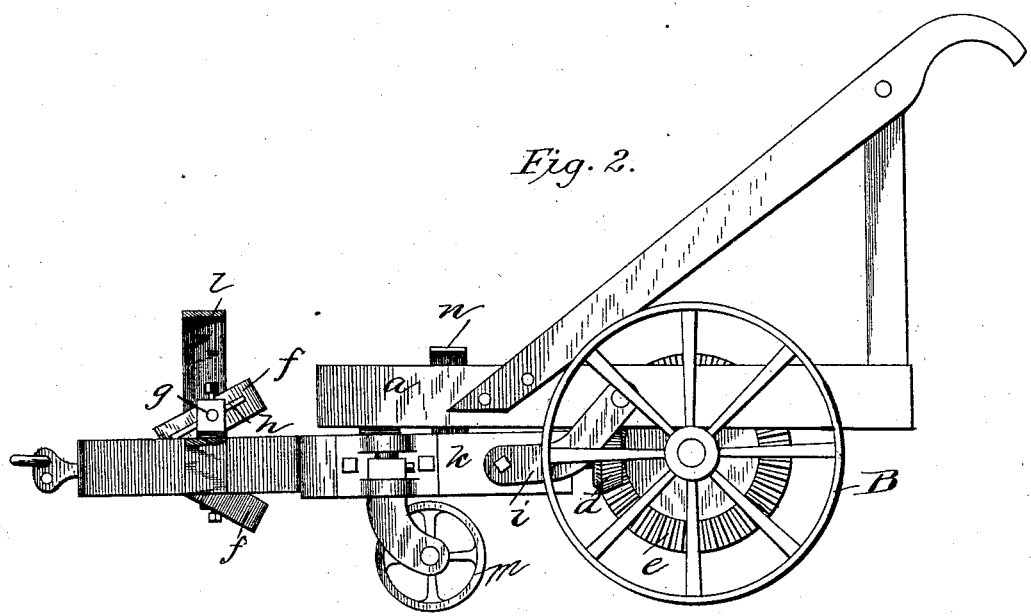
Figure 3:
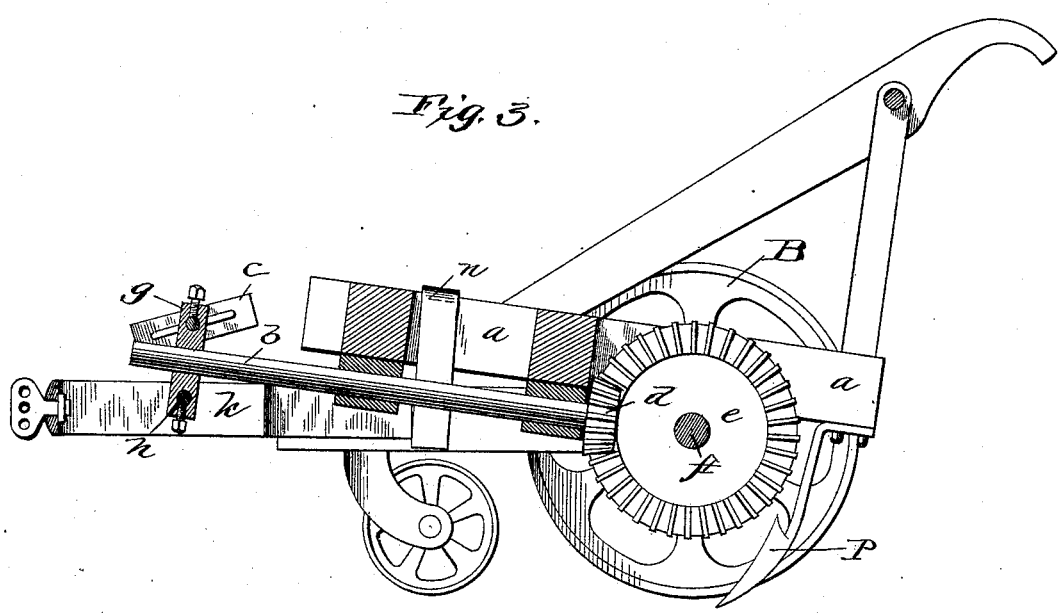

In the accompanying drawings, Figure 1 represents a plan view of the device, and Fig. 2 a side elevation. Fig. 3 is a sectional view of the apparatus, taken lengthwise thereof.

The frame of the device is composed of two longitudinal beams $a\ a$, connected by cross-braces, which serve to support the bearings of a longitudinal shaft $b$, which carries upon one end the cutters $c\ c$ and upon the other end a beveled gear $d$, meshing with the crown-wheel $e$ on the main shaft A, on the outer ends of which are secured the traction-wheels B B. As the apparatus is propelled, the traction of the main driving-wheels rotates the shaft, and through the crown-wheel secured thereto the longitudinal shaft is driven and the cutters thereby rotated. These cutters are of novel construction, and consist of curved plates $f$, supported from a shank $g$ by the arms $h$, these arms being of light material, with a space between them, and the cutters being of flat metal with sharpened edges, so that no obstruction is offered by any part of the cutters or their supports in the operation of chopping. The shaft $b$ has a cross-bar on its extreme forward end, and in each end of this cross-bar is adjustably supported the shank of one of the cutters, the adjustment being permitted by means of a set-screw, so that the circumferential sweep of the cutters may be more or less, as required. By means of the adjustment of the cross-head the intervals between the cuts may be made greater or less.

Beneath the main frame is a supplemental frame hinged by straps $i$ to the main beams $a$ in advance of the main driving-axles, and connected to the forward end of the supplemental frame is a rectangular frame $k$, inclosing the cutters, and to the forward end of this frame is connected the whiffletree for the attachment of the horses. A shield $l$ passes from either side of this frame above the cutters, so as to protect persons in proximity to it from injury, and also to provide a support for the reins leading from the operator to the horses.

In order to regulate the depth of cut without the adjustment of the cutters, we provide adjustable bearing-wheels $m$, having their bearings in the supplemental frames, in which they are swiveled. In addition to the adjustment stated, by reason of the fact that the supplemental frame is hinged forward of the axle, the operator may lift the cutters out of the ground entirely or regulate the cut as required by throwing his weight on the handle, which will cause the main frame to pivot on the axle, which will elevate the cutter-shaft and the cutters carried thereby, while the supplemental frame, being hinged to the main frame, will still have its bearing upon the ground.

In order to limit the upward movement of the main frame, we provide stops $n$, which are connected to the beams of the supplemental frames, with overturned ends extending across the line of movement of the beams $a\ a$.

We attach to the beams $a\ a$ shovel-standards P, as shown in Fig. 3.

Having thus described our invention, what we claim is—

1. In combination, a main frame, a driving-axle, a cutter-shaft supported by the main frame and having geared connections with the axle, a supplemental frame hinged to the main frame, with bearing-wheels for the supplemental frame, whereby the operator by elevating the main frame at its front end may throw the cutters more or less out of work, substantially as described.

2. In combination, a main frame, a cutter-shaft carried thereby, a supplemental frame hinged to the main frame forward of the axle, and stops for limiting the upward movement of the main frame, said stops being connected to the supplemental frame, substantially as described.

GEORGE E. HUGULEY.
JOHN THOMAS CHAMBERS, JR.

Witnesses:
B. H. BUTTS,
R. G. MATTHEWS.